(12) United States Patent
Nishikawa et al.

(10) Patent No.: US 9,431,638 B2
(45) Date of Patent: Aug. 30, 2016

(54) NON-AQUEOUS SECONDARY BATTERY SEPARATOR AND NON-AQUEOUS SECONDARY BATTERY

(71) Applicant: TEIJIN LIMITED, Osaka-shi, Osaka (JP)

(72) Inventors: Satoshi Nishikawa, Iwakuni (JP); Takashi Yoshitomi, Iwakuni (JP); Atsuhiro Otsuka, Iwakuni (JP); Ayumi Iwai, Iwakuni (JP)

(73) Assignee: TEIJIN LIMITED, Osaka (JP)

( * ) Notice: Subject to any disclaimer, the term of this patent is extended or adjusted under 35 U.S.C. 154(b) by 131 days.

(21) Appl. No.: 14/352,522

(22) PCT Filed: Oct. 19, 2012

(86) PCT No.: PCT/JP2012/077132
§ 371 (c)(1),
(2) Date: Apr. 17, 2014

(87) PCT Pub. No.: WO2013/058368
PCT Pub. Date: Apr. 25, 2013

(65) Prior Publication Data
US 2014/0308567 A1    Oct. 16, 2014

(30) Foreign Application Priority Data

Oct. 21, 2011  (JP) .................................. 2011-231834

(51) Int. Cl.
| | |
|---|---|
| *H01M 2/16* | (2006.01) |
| *H01M 10/052* | (2010.01) |
| *H01M 2/14* | (2006.01) |
| *H01M 2/02* | (2006.01) |
| *C09D 1/00* | (2006.01) |

(52) U.S. Cl.
CPC .............. *H01M 2/0257* (2013.01); *C09D 1/00* (2013.01); *H01M 2/027* (2013.01); *H01M 2/1653* (2013.01); *H01M 2/1686* (2013.01); *H01M 10/052* (2013.01); *Y02E 60/122* (2013.01)

(58) Field of Classification Search
CPC ..... H01M 2/162; H01M 2/1653; H01M 2/18; H01M 2/14; H01M 2/1693; H01M 2/1686; H01M 2/1666

See application file for complete search history.

(56) References Cited

U.S. PATENT DOCUMENTS

| | | | |
|---|---|---|---|
| 6,692,873 B1 * | 2/2004 | Park ...................... | H01M 2/145 29/623.5 |
| 2004/0053122 A1 † | 3/2004 | Sugiyama et al. | |
| 2006/0088762 A1 † | 4/2006 | Okamoto | |
| 2006/0286446 A1 † | 12/2006 | Chun et al. | |

FOREIGN PATENT DOCUMENTS

| | | |
|---|---|---|
| JP | 2000-021233 A | 1/2000 |
| JP | 2001-076758 A | 3/2001 |
| JP | 2001-319693 A | 11/2001 |
| JP | 2002-025620 A | 1/2002 |
| JP | 2003-007280 A | 1/2003 |
| JP | 2003-178804 A | 6/2003 |
| JP | 2004-111160 A | 4/2004 |
| JP | 2006-120462 A | 5/2006 |
| JP | 4109522 B2 | 7/2008 |
| JP | 4127989 B2 | 7/2008 |
| JP | 4414165 B2 | 2/2010 |
| JP | 4490055 B2 | 6/2010 |
| WO | 2004/112183 A1 | 12/2004 |

OTHER PUBLICATIONS

International Search Report of PCT/JP2012/077132 dated Jan. 15, 2013.

\* cited by examiner
† cited by third party

*Primary Examiner* — Carlos Barcena
(74) *Attorney, Agent, or Firm* — Sughrue Mion, PLLC

(57) ABSTRACT

The present invention provides a separator for a non-aqueous secondary battery including a porous substrate and an adhesive porous layer that is formed at at least one side of the porous substrate and contains the following polyvinylidene fluoride-based resin A and the following polyvinylidene fluoride-based resin B. (1) Polyvinylidene fluoride resin A selected from the group consisting of vinylidene fluoride homopolymers having a weight average molecular weight of from 600,000 to 2,500,000, and vinylidene fluoride copolymers having a weight average molecular weight of from 600,000 to 2,500,000 and containing a structural unit derived from vinylidene fluoride and a structural unit derived from hexafluoropropylene, the total content of structural units derived from hexafluoropropylene in each of the vinylidene fluoride copolymers being 1.5 mol % or less of the total content of structural units in each of the vinylidene fluoride copolymer. (2) Polyvinylidene fluoride resin B containing a structural unit derived from vinylidene fluoride and a structural unit derived from hexafluoropropylene, the total content of structural units derived from hexafluoropropylene in the polyvinylidene fluoride resin B being greater than 1.5 mol % of the total content of structural units in the polyvinylidene fluoride resin B.

7 Claims, No Drawings

NON-AQUEOUS SECONDARY BATTERY SEPARATOR AND NON-AQUEOUS SECONDARY BATTERY

CROSS REFERENCE TO RELATED APPLICATIONS

This is a National Stage of International Application No. PCT/JP2012/077132 filed Oct. 19, 2012 (claiming priority based on Japanese Patent Application No. 2011-231834 filed Oct. 21, 2011), the contents of which are incorporated herein by reference in their entirety.

TECHNICAL FIELD

The present invention relates to a separator for a non-aqueous secondary battery and a non-aqueous secondary battery.

BACKGROUND ART

Non-aqueous secondary batteries, such as lithium ion secondary batteries, have been widely used as power supply for portable electronic devices such as lap-top computers, mobile phones, digital cameras, and camcorders. Further, in recent years, since these batteries have high energy density, application of these batteries to automobiles and the like has also been studied.

In conjunction with reductions in size and weight of portable electronic devices, the outer casing of non-aqueous secondary batteries has been simplified. Recently, as the outer casing, a battery can made of an aluminum can has been developed in place of the battery can made of stainless steel that was previously used, and further, currently, a soft pack outer casing made of an aluminum laminate pack has also been developed.

In the case of a soft pack outer casing made of aluminum laminate, since the outer casing is soft, a space may form between an electrode and a separator in conjunction with charging and discharging. This is one of factors contributing to deterioration of the cycle life, and therefore, uniform retention of the adhesive property of adhered portions of electrodes, separators, or the like, is a significant technical problem.

As techniques relating to the adhesive property, various techniques for enhancing the adhesion between an electrode and a separator have been proposed. As one of such techniques, a technique of using a separator in which a porous layer (hereinafter also referred to as an "adhesive porous layer") using a polyvinylidene fluoride resin is formed on a polyolefin microporous membrane, a conventional separator, has been proposed (see, for example, Patent Documents 1 to 4). The adhesive porous layer functions as an adhesive that favorably joins the electrode and the separator together, in a case in which an adhesive porous layer and an electrode are disposed adjacently in layers and subjected to compression bonding or heat pressing. Accordingly, the adhesive porous layer contributes to improvement of the cycle life of a soft pack battery.

In a separator having a polyolefin microporous membrane and an adhesive porous layer formed thereon as described above, from the viewpoint of achieving both ion permeability and ensuring sufficient adhesive property, a new technical proposal focusing upon the porous structure and thickness of a polyvinylidene fluoride resin layer, and a new technical proposal that uses two kinds of polyvinylidene fluoride resins in combination, have been made.

Further, in the case of producing a battery using a conventional metal can outer casing, electrodes and a separator are disposed adjacently in layers and wound to produce a battery element, and this element is enclosed in a metal can outer casing together with an electrolyte, thereby producing a battery. Meanwhile, in the case of producing a soft pack battery using a separator having the adhesive porous layer described above, a battery element is produced in a manner similar to that in the production of a battery having a metal can outer casing as described above, after which this battery element is enclosed in a soft pack outer casing together with an electrolyte, and thereafter, is finally subjected to a heat pressing process, thereby producing a battery. Accordingly, in the case of using such a separator, a battery element can be produced in a manner similar to that in the production of a battery having a metal can outer casing as described above. This is advantageous in that it is not necessary to greatly change the production process from that for conventional batteries having a metal can outer casing.

Patent Document 1: Japanese Patent No. 4127989
Patent Document 2: Japanese Patent No. 4490055
Patent Document 3: Japanese Patent No. 4109522
Patent Document 4: Japanese Patent No. 4414165

SUMMARY OF INVENTION

Technical Problem

In general, the positive electrode or negative electrode in a non-aqueous secondary battery includes a current collector and an active substance layer that is formed on the current collector and contains an electrode active substance and a binder resin. In a case in which an adhesive porous layer is joined to the electrode by compression bonding or heat pressing, the adhesive porous layer adheres to the binder resin in the electrode. Therefore, in order to ensure a more favorable adhesive property, a higher amount of binder resin in the electrode is preferable.

On the other hand, in order to further increase the energy density of a battery, it is necessary to increase the content of the active substance in the electrode, and therefore, a lower content of binder resin is preferable. Therefore, according to the conventional technique described above, in order to increase the amount of the active substance, it has been necessary to perform compression bonding or heat pressing under higher temperature conditions or pressure conditions, for the purpose of ensuring sufficient adhesive property. However, when increased temperature conditions or pressure conditions are applied to the compression bonding or heat pressing, there is a problem in that the porous structure of the adhesive porous layer is destroyed, ion permeability becomes insufficient and, as a result, favorable battery characteristics cannot be obtained.

In addition, in such a separator, the adhesive porous layer is easily peeled off during transport. In particular, in the case of slitting the separator into an appropriate size, when the adhesive porous layer is too sticky or the like, there is a problem in terms of ease of slitting; namely, a phenomenon occurs in which the slit edge face after slitting is scuffed up.

The invention has been made in view of these circumstances. With this background, a separator for a non-aqueous secondary battery which exhibits excellent adhesion to electrodes and ensures favorable ion permeability even after adhesion to electrodes, as well as having excellent ease of slitting, compared with the prior art, is required. Further, a non-aqueous secondary battery which has high energy density and excellent cycle characteristics is required.

Solution to Problems

In order to address the problems described above, the invention is configured as follows.

<1> A separator for a non-aqueous secondary battery, including a porous substrate and an adhesive porous layer that is formed at at least one side of the porous substrate and contains the following (1) polyvinylidene fluoride resin A and the following (2) polyvinylidene fluoride resin B.

(1) Polyvinylidene fluoride resin A selected from the group consisting of vinylidene fluoride homopolymers having a weight average molecular weight of from 600,000 to 2,500,000, and vinylidene fluoride copolymers having a weight average molecular weight of from 600,000 to 2,500,000 and containing a structural unit derived from vinylidene fluoride and a structural unit derived from hexafluoropropylene, the total content of structural units derived from hexafluoropropylene in each of the vinylidene fluoride copolymers being 1.5 mol % or less of the total content structural units in each of the vinylidene fluoride copolymers.

(2) Polyvinylidene fluoride resin B selected from the group consisting of vinylidene fluoride copolymers containing a structural unit derived from vinylidene fluoride and a structural unit derived from hexafluoropropylene, the total content of structural units derived from hexafluoropropylene in each of the vinylidene fluoride copolymers being greater than 1.5 mol % of the total content of structural units in each of the vinylidene fluoride copolymers.

<2> The separator for a non-aqueous secondary battery according to <1>, wherein the weight average molecular weight of the polyvinylidene fluoride resin A is from 1,000,000 to 2,000,000.

<3> The separator for a non-aqueous secondary battery according to <1> or <2>, wherein the adhesive porous layer has a porosity of from 30% to 60% and an average pore size of from 20 nm to 100 nm.

<4> The separator for a non-aqueous secondary battery according to any one of <1> to <3>, wherein, in the adhesive porous layer, the total content of the polyvinylidene fluoride resin A is from 15 parts by mass to 85 parts by mass and the total content of the polyvinylidene fluoride resin B is from 85 parts by mass to 15 parts by mass, when the total amount of the polyvinylidene fluoride resin A and the polyvinylidene fluoride resin B is taken as 100 parts by mass.

<5> The separator for a non-aqueous secondary battery according to any one of <1> to <4>, wherein an amount of the adhesive porous layer at one side of the porous substrate is from 0.5 g/m$^2$ to 1.5 g/m$^2$.

<6> A non-aqueous secondary battery including a positive electrode, a negative electrode, and the separator for a non-aqueous secondary battery according to any one of <1> to <5>, the separator being disposed between the positive electrode and the negative electrode, wherein in the non-aqueous secondary battery, electromotive force is obtained by lithium doping/dedoping.

<7> The non-aqueous secondary battery according to <6> further including an aluminum laminate film as an outer casing material, wherein a multilayer structure in which the positive electrode, the negative electrode, and the separator for a non-aqueous secondary battery are adhered to each other is housed in the aluminum laminate film.

Advantageous Effects of Invention

According to the invention, a separator for a non-aqueous secondary battery which exhibits excellent adhesion to electrodes and ensures favorable ion permeability even after adhesion to electrodes, as well as having excellent ease of slitting, compared with conventional techniques, is provided.

Further, according to the invention, a non-aqueous secondary battery which has high energy density and excellent cycle characteristics is provided. Moreover, it is possible to provide a high-performance non-aqueous secondary battery having an aluminum laminate pack outer casing.

BEST MODE FOR CARRYING OUT THE INVENTION

Hereinafter, a separator for a non-aqueous secondary battery of the invention and a non-aqueous secondary battery using the same are described in detail. Note that, hereinafter, "to" in a numerical range means that the numerical range includes the upper limit and the lower limit.

<Separator for Non-Aqueous Secondary Battery>

The separator for a non-aqueous secondary battery of the invention is configured to include a porous substrate and an adhesive porous layer that is formed at at least one side of the porous substrate and contains a polyvinylidene fluoride resin. The separator for a non-aqueous secondary battery of the invention contains (1) polyvinylidene fluoride resin A and (2) polyvinylidene fluoride resin B shown below, as the polyvinylidene fluoride resins that are components of the adhesive porous layer.

(1) Polyvinylidene fluoride resin A selected from the group consisting of vinylidene fluoride homopolymers having a weight average molecular weight of from 600,000 to 2,500,000, and vinylidene fluoride copolymers having a weight average molecular weight of from 600,000 to 2,500,000 and containing a structural unit derived from vinylidene fluoride and a structural unit derived from hexafluoropropylene, the total content of structural units derived from hexafluoropropylene in each of the vinylidene fluoride copolymers being 1.5 mol % or less of the total content of structural units in each of the vinylidene fluoride copolymers.

(2) Polyvinylidene fluoride resin B selected from the group consisting of vinylidene fluoride copolymers containing a structural unit derived from vinylidene fluoride and a structural unit derived from hexafluoropropylene, and the total content of structural units derived from hexafluoropropylene in each of the vinylidene fluoride copolymers being greater than 1.5 mol % of the total content of structural units in each of the vinylidene fluoride copolymers.

In the invention, a polyvinylidene fluoride resin is used as an adhesive resin that is a component of the adhesive porous layer included in the separator, and a resin composition in which specific polyvinylidene fluoride resins are combined, namely, a composition including polyvinylidene fluoride resin A and polyvinylidene fluoride resin B, is used. Therefore, as compared with the case of not including one of polyvinylidene fluoride resin A or polyvinylidene fluoride resin B, the adhesion to electrodes is more excellent, and excellent ion permeability is obtained after adhesion to electrodes, as well as excellent slittability is realized. The reason for this is thought as follows.

Polyvinylidene fluoride resins (hereinafter also referred to as "VDF-HFP resins"), which contain vinylidene fluoride and hexafluoropropylene as the polymerization components, become easily to swell with an electrolyte, in a case in which the polymerization ratio of hexafluoropropylene increases. Therefore, it is also expected that the greater the polymerization ratio of hexafluoropropylene in a VDF-HFP resin that is a component of the adhesive porous layer is, the better is the adhesion between the adhesive porous layer and an electrode.

However, in a case in which an adhesive porous layer is formed using a VDF-HFP resin having a high polymerization ratio of hexafluoropropylene, the porosity is easily heightened and the pore size is easily increased. In a case in which the adhesive porous layer has a high porosity and a large pore size, in the surface of the adhesive porous layer, the area of the VDF-HFP resin portion at which the VDF-HFP resin bonds to an electrode is reduced, and, therefore, the VDF-HFP resin portions exist sparsely. Therefore, as the polymerization ratio of hexafluoropropylene of the VDF-HFP resin that is a component of the adhesive porous layer is increased, contrary to the above expectation, the adhesion between the adhesive porous layer and an electrode tends to be rather lowered. In addition, in a case where the adhesive porous layer has a high porosity and a large pore size, ion migration at the electrode interface becomes ununiform, which adversely affects cycle characteristics and load characteristics of a battery.

In other words, it can be said that the polymerization ratio of hexafluoropropylene of the VDF-HFP resin may be reduced, in order to obtain an adhesive porous layer having such a low porosity and a smaller pore size that the ion permeability is not inhibited. It is expected that, with such an adhesive porous layer, the uniformity in ion migration at the electrode interface is high, the adhesive porous layer does not adversely affects the cycle characteristics and load characteristics of a battery, and also, the adhesion to electrodes improves, considering the form of the surface morphology.

However, VDF-HFP resins having a low polymerization ratio of hexafluoropropylene have inferior swelling property with respect to an electrolyte, and thus it is difficult to obtain high adhesion to electrodes.

Conventionally, as a means to improve the adhesion between an electrode and a separator, a means of heightening the pressure and temperature at the time of compression bonding or heat pressing has been used. However, as the temperature and pressure for compression bonding or heat pressing are heightened, the porous structure of the adhesive porous layer is more easily destroyed, and ion permeability after adhesion to an electrode is deteriorated. Thus, it has been difficult to obtain favorable battery characteristics.

Accordingly, the invention intends to obtain excellent battery characteristics as well as enhanced adhesion to electrodes, by using two kinds of VDF-HFP resins having different polymerization ratio of hexafluoropropylene in the adhesive porous layer.

Namely, by using polyvinylidene fluoride resin B which has a relatively high polymerization ratio of hexafluoropropylene, the swelling property of the VDF-HFP resin with respect to an electrolyte is ensured in the adhesive porous layer. Further, by using polyvinylidene fluoride resin A which has a relatively low polymerization ratio of hexafluoropropylene, an adhesive porous layer having such a low porosity and a small pore size that the ion permeability is not inhibited is realized. As a result, the uniformity in ion migration at the electrode interface is heightened, and a surface morphology suitable for adhesion to electrodes is obtained.

In the invention, as described above, since both the adhesive porous layer resin A and the adhesive porous layer resin B exist in the adhesive porous layer, a synergistic effect is exhibited with respect to the adhesion to electrodes, so that the adhesion to electrodes becomes more excellent, and even after adhesion to electrodes, favorable ion permeability is ensured. Accordingly, when prepared as a battery, the battery exhibits excellent cycle characteristics and excellent load characteristics.

Moreover, the separator of the invention have excellent ion migration at the interface between the porous substrate and the adhesive porous layer.

Conventionally, in separators having an adhesive porous layer placed on a porous substrate, clogging easily occurs at the interface between the adhesive porous layer and the porous substrate, ion migration at the interface is deteriorated and thus, it is sometimes difficult to realize favorable battery characteristics. In contrast, the adhesive porous layer in the invention has a fine porous structure developed, and thus the uniformity of the pore distribution is high and the number of pores is large. Further, since the adhesive porous layer in the invention has excellent adhesive property, regarding the conditions of temperature or pressure at the time of compression bonding or heat pressing, room for choice thereof is extended, and thus, occurrence of destruction may be avoided easily. Therefore, the possibility that the pores of the porous substrate and the pores of the adhesive porous layer are favorably connected increases, whereby the lowering of battery performance due to clogging is suppressed.

In addition to the above, in the invention, the weight average molecular weight of polyvinylidene fluoride resin A is set within a range of from 600,000 to 2,500,000. Since the polyvinylidene fluoride resin A having a low HFP ratio has a characteristic of being relatively hard to swell, it is effective to adjust the molecular weight of polyvinylidene fluoride resin A, compared with polyvinylidene fluoride resin B. As described below, the molecular size is adjusted to be within the above range, in order to balance suppression of generation of strong stickiness with prevention of the embrittlement of the adhesive porous layer. Accordingly, adherence to the porous substrate is ensured, and at the time of slitting, the external appearance of the edge face is kept from being destroyed for the reason that the slit edge face is scuffed up or the like.

Hereinafter, each component of the separator for a non-aqueous secondary battery of the invention is described.

[Porous Substrate]

The separator for a non-aqueous secondary battery of the invention is provided with at least one layer of porous substrate. The porous substrate in the invention means a substrate having pores or voids inside. Examples of such a substrate include a microporous membrane, a porous sheet formed from a fibrous material, such as nonwoven fabric or a paper-like sheet, and a composite porous sheet obtained by placing one or more other porous layers on the microporous membrane or porous sheet. Among them, a microporous membrane is particularly preferable, from the viewpoints of thinning and high strength.

A microporous membrane means a membrane having a large number of micropores inside, in which the micropores are connected to allow gas or liquid to pass therethrough from one side to the other side of the membrane.

The material that forms the porous substrate may be either an organic material or an inorganic material as far as the material has an electrical insulating property. From the viewpoint of imparting a shutdown function to the porous substrate, the material that forms the porous substrate is preferably a thermoplastic resin.

The term "shutdown function" refers to the following function. Namely, in a case in which the battery temperature becomes high, the constituent material melts and blocks the pores of the porous substrate, thereby blocking the ion migration to prevent thermal runaway of the battery.

As the thermoplastic resin, a thermoplastic resin having a melting point of lower than 200° C. is suitable, and polyolefin is particularly preferable.

As the porous substrate using polyolefin, a polyolefin microporous membrane is preferable.

As the polyolefin microporous membrane, a polyolefin microporous membrane that has sufficient dynamic physical properties and ion permeability can be preferably used, among the polyolefin microporous membranes that have been applied to conventional separators for a non-aqueous secondary battery.

From the viewpoint of exhibiting the shutdown function, it is preferable that the polyolefin microporous membrane contains polyethylene, and it is preferable that the content of polyethylene is 95% by mass or more.

In addition to the above, from the viewpoint of imparting heat resistance to such a degree that the membrane does not easily break when exposed to high temperatures, a polyolefin microporous membrane containing polyethylene and polypropylene is preferable. An example of such a polyolefin microporous membrane is a microporous membrane in which polyethylene and polypropylene are present as a mixture in one layer. In such a microporous membrane, it is preferable that the microporous membrane contains polyethylene in an amount of 95% by mass or more and polypropylene in an amount of 5% by mass or less, from the viewpoint of achieving both the shutdown function and heat resistance. Further, from the viewpoint of achieving both the shutdown function and heat resistance, it is also preferable that the polyolefin microporous membrane is a polyolefin microporous membrane having a multi-layer structure of two or more layers, in which at least one layer contains polyethylene and at least one layer contains propylene.

It is preferable that the polyolefin contained in the polyolefin microporous membrane has a weight average molecular weight of from 100,000 to 5,000,000. When the weight average molecular weight is 100,000 or more, sufficient dynamic physical properties can be ensured. Meanwhile, when the weight average molecular weight is 5,000,000 or less, the shutdown characteristics are favorable, and it is easy to form a membrane.

The polyolefin microporous membrane can be produced, for example, by the following method. Namely, an example of the method of forming a microporous membrane is a method including: (i) extruding a molten polyolefin resin through a T-die to form a sheet, (ii) subjecting this sheet to a crystallization treatment, (iii) stretching the sheet, and (iv) subjecting the sheet that has been stretched to a heat treatment. Further, other examples of the method of forming a microporous membrane include a method including: (i) melting a polyolefin resin together with a plasticizer such as liquid paraffin or the like, and extruding the melt through a T-die, followed by cooling, to form a sheet, (ii) stretching this sheet, (iii) extracting the plasticizer from the sheet that has been stretched, and (iv) subjecting the resulting sheet to a heat treatment.

Examples of a porous sheet formed from a fibrous material include a porous sheet formed from a fibrous material such as polyester such as polyethylene terephthalate; polyolefin such as polyethylene or polypropylene; or a heat resistant polymer such as aromatic polyamide, polyimide, polyethersulfone, polysulfone, polyetherketone, or polyetherimide; and a porous sheet formed from any mixture of the above fibrous materials.

A composite porous sheet may have a configuration in which a functional layer is disposed on a microporous membrane or a porous sheet formed from a fibrous material. Such a composite porous sheet is preferable, since a further function can be imparted by the functional layer. As the functional layer, for example, from the viewpoint of imparting heat resistance, a porous layer formed from a heat resistant resin or a porous layer formed from a heat resistant resin and an inorganic filler can be adopted. Examples of the heat resistant resin include one or two or more kinds of heat resistant polymers selected from the group consisting of aromatic polyamide, polyimide, polyethersulfone, polysulfone, polyetherketone, and polyetherimide. As the inorganic filler, a metal oxide such as alumina, a metal hydroxide such as magnesium hydroxide, or the like can be used suitably.

Examples of a method of forming a composite include a method of coating a functional layer on a microporous membrane or a porous sheet, a method of joining a functional layer and a microporous membrane or a porous sheet using an adhesive, and a method of compression bonding or thermocompression bonding of a functional layer and a microporous membrane or a porous sheet.

The thickness of the porous substrate is preferably in a range of from 5 μm to 25 μm, from the viewpoint of obtaining favorable dynamic physical properties and internal resistance.

The Gurley value (JIS P8117) of the porous substrate is preferably in a range of from 50 sec/100 cc to 800 sec/100 cc, from the viewpoints of preventing a short circuit in the battery and obtaining sufficient ion permeability.

The puncture strength of the porous substrate is preferably 300 g or more, from the viewpoint of improving the production yield.

[Adhesive Porous Layer]

The separator for a non-aqueous secondary battery of the invention has at least one adhesive porous layer at one side or both sides of the porous substrate. The adhesive porous layer according to the invention means a layer that contains a polyvinylidene fluoride resin as an adhesive resin and has a large number of micropores inside, in which these micropores are connected to allow gas or liquid to pass therethrough from one side to the other side.

The adhesive porous layer is provided at one side or both sides of the porous substrate, as an outermost layer of a separator, and by this adhesive porous layer, the separator can be adhered to an electrode. Namely, the adhesive porous layer is a layer which can bond a separator to an electrode, when the separator and the electrode are disposed adjacently in layers and subjected to compression bonding or heat pressing.

The case in which the separator is bonded to both of the positive electrode and the negative electrode is preferable, from the viewpoint of cycle life. Thus, in a preferable embodiment, the adhesive porous layer is provided at both of one side and the other side of the porous substrate (front and back of the substrate).

In a case in which the separator for a non-aqueous secondary battery of the invention has the adhesive porous layer only at one side of the porous substrate, the adhesive porous layer is adhered to either one of a positive electrode or a negative electrode. Further, in a case in which the separator for a non-aqueous secondary battery of the invention has the adhesive porous layer at both sides of the porous substrate, the adhesive porous layers are bonded to the positive electrode and the negative electrode, respectively. Providing an adhesive porous layer not only at one side of the porous substrate but at both sides is preferable form the viewpoint of excellent cycle characteristics when a battery is formed. This is because, by having the adhesive porous layer at both sides of the porous substrate, the two surfaces of the separator adhere well to the two electrodes, respectively, via the adhesive porous layer.

It is preferable that the adhesive porous layer in the invention has a porous structure from the viewpoint of ion permeability. Specifically, it is preferable that the porosity is from 30% to 60%. When the porosity of the adhesive porous layer is 60% or less, in the pressing process for adhesion to electrodes, dynamic physical properties for keeping the porous structure are easily ensured. When the porosity is 60% or less, the ratio of surface opening area decreases, and the area occupied by the polyvinylidene fluoride resin portion is increased, whereby adhesion force is easily ensured. Meanwhile, when the porosity of the adhesive porous layer is 30% or more, favorable ion permeability is obtained, and the battery characteristics are easily improved.

Further, it is preferable that the average pore size of the adhesive porous layer according to the invention is from 20 nm to 100 nm. Here, the average pore size (diameter; unit: nm) is calculated, assuming that all pores are cylindrical, from the following Equation 1 using the pore surface area S of the adhesive porous layer formed from a polyvinylidene fluoride resin, which is calculated from the amount of nitrogen gas adsorbed, and the pore volume V of the adhesive porous layer, which is calculated from the porosity.

$$d = 4 \cdot V/S \quad \text{(Equation 1)}$$

d: average pore size (nm) of adhesive porous layer
V: pore volume per 1 $m^2$ of adhesive porous layer
S: pore surface area per 1 $m^2$ of adhesive porous layer The pore surface area S of an adhesive porous layer is determined as follows.

Namely, the specific surface area ($m^2/g$) of a porous substrate and the specific surface area ($m^2/g$) of a composite membrane in which a porous substrate and an adhesive porous layer are layered one another are measured by a nitrogen gas adsorption method, applying the BET equation. Then, these specific surface areas are each multiplied by the respective weights per unit ($g/m^2$) to determine the pore surface areas per 1 $m^2$. Then, the pore surface area per 1 $m^2$ of the porous substrate is subtracted from the pore surface area per 1 $m^2$ of the separator, to determine the pore surface area S per 1 $m^2$ of the adhesive porous layer.

When the average pore size of the adhesive porous layer is 100 nm or less, a porous structure in which uniform pores are uniformly dispersed is easily obtained, and points of bonding to electrode can be dispersed uniformly, whereby favorable adhesive property may be ensured easily. In such a case, ion migration also becomes uniform, more favorable cycle characteristics is obtained, and further, favorable load characteristics is obtained.

When the average pore size is 20 nm or more, ions move easily, and favorable battery characteristics are easily obtained. The reason for this is specifically explained.

First, in a case in which the adhesive porous layer is impregnated with an electrolyte, the polyvinylidene fluoride resin swells. Although, the degree of swelling varies depending on the constitution of the polyvinylidene fluoride resin, in the case of a polyvinylidene fluoride resin according to the invention, when the average pore size is 20 nm or more, the pores are easily prevented from being blocked due to swelling of resin, when the adhesive porous layer is impregnated with an electrolyte. Therefore, even in the state of being swelled, pore portions for ion migration are easily ensured and favorable battery characteristics are obtained easier, as compared with the case in which such pore portions are blocked. Here, in the case in which pore portions are blocked, ions can move only inside the polyvinylidene fluoride resin that contains the electrolyte and is gelled, and thus, the ion migration becomes extremely slow as compared with the case in which pores are not blocked.

According to the invention, an adhesive porous layer which has a porosity suitable for a separator for a non-aqueous secondary battery, and has an average pore size much smaller than that of a conventional adhesive porous layer can be obtained. This means that a fine porous structure is developed and is uniform. As described above, such a porous structure has favorable uniformity of ion migration at the interface between the separator and an electrode. Accordingly, an electrode reaction with high uniformity becomes possible, and effects of improving the load characteristics and cycle characteristics of a battery are obtained. In addition, since the polyvinylidene fluoride resin portions that contribute to adhesion are highly uniformly distributed on the surface, favorable adhesion to electrodes is achieved.

Further, in the invention, the porous structure also improves the ion migration at the interface between the porous substrate and the adhesive porous layer. In a multilayer type separator such as those like the separator of the invention, clogging easily occurs at the interface between two layers, and the ion migration at the interface is easily deteriorated. Therefore, it is sometimes difficult to obtain favorable battery characteristics. However, the adhesive porous layer according to the invention has a fine porous structure developed, and thus the uniformity of pore distribution is high and the number of pores is large. Therefore, the possibility that the pores of the porous substrate and the pores of the adhesive porous layer formed by using a polyvinylidene fluoride resin can be favorably connected increases, whereby it is possible to significantly suppress the lowering of performance due to clogging.

Among the above, the average pore size is more preferably in a range of from 30 nm to 90 nm.

—Polyvinylidene Fluoride Resin—

The adhesive porous layer in the invention contains at least one kind of (1) polyvinylidene fluoride resin A and at least one kind of (2) polyvinylidene fluoride resin B, which are described below. By mixing these two kinds of polyvinylidene fluoride resins, compared with the case of using one kind of these polyvinylidene fluoride resins, the adhesion to electrodes is remarkably enhanced.

(1) Polyvinylidene fluoride resin A: a vinylidene fluoride homopolymer having a weight average molecular weight of from 600,000 to 2,500,000, and/or a vinylidene fluoride copolymer having a weight average molecular weight of from 600,000 to 2,500,000 and containing a structural unit derived from vinylidene fluoride and a structural unit derived from hexafluoropropylene, the total content of structural units derived from hexafluoropropylene in the vinylidene fluoride copolymer being (greater than 0 mol % but) 1.5 mol % or less of the total content of structural units in the vinylidene fluoride copolymer.

(2) Polyvinylidene fluoride resin B: a vinylidene fluoride copolymer containing a structural unit derived from vinylidene fluoride and a structural unit derived from hexafluoropropylene, the total content of structural units derived from hexafluoropropylene in the vinylidene fluoride copolymer being greater than 1.5 mol % of the total content of structural units in the vinylidene fluoride copolymer.

(1) Polyvinylidene Fluoride Resin A

Polyvinylidene fluoride resin A is a polymer that contains at least a structural unit derived from vinylidene fluoride (VDF), and a structural unit derived from hexafluoropropylene (HFP), in which the total content of structural units derived from hexafluoropropylene in the polymer is 1.5 mol % or less of the total content of structural units in the polymer. In the case of containing HFP as the copolymerization component, a vinylidene fluoride copolymer containing a structural unit derived from VDF and a structural unit derived from HFP is included. Further, the content of structural units derived from HFP may be 0 (zero) mol %, and in this case, a vinylidene fluoride homopolymer is included as the polyvinylidene fluoride resin A. When the copolymerization ratio of hexafluoropropylene in the polyvinylidene fluoride resin A is greater than 1.5 mol %, the copolymer corresponds to the polyvinylidene fluoride resin B described below, and thus, the adhesive porous layer has a configuration in which at least two kinds which differ in the HFP amount at a prescribed range are not contained. As a result, the swelling property with respect to an electrolyte becomes too great, and it becomes difficult to realize a preferable surface morphology as described above. Accordingly, favorable adhesion to electrodes cannot be obtained. The polyvinylidene fluoride resin A may be a mixture obtained by mixing a vinylidene fluoride homopolymer and a copolymer.

The total content of structural units derived from hexafluoropropylene in the polyvinylidene fluoride resin A is preferably in a range of from 0.5 mol % to 1.5 mol %, and more preferably in a range of from 1.0 mol % to 1.4 mol %.

The weight average molecular weight (Mw) of the polyvinylidene fluoride resin A is in a range of from 600,000 to 2,500,000. When the weight average molecular weight is less than 600,000, the adhesive porous layer formed is significantly brittle, whereby the adhesion between the adhesive porous layer and the porous substrate is lowered. Therefore, in the case of performing line conveyance in the production process of a separator, a phenomenon in which the adhesive porous layer easily separates from the porous substrate (lowering of handling property) is caused. Meanwhile, when the weight average molecular weight is greater than 2,500,000, the adhesive porous layer becomes strongly sticky, and thus it is hard to favorably ensure the external appearance of the edge face, for the reason that the slit edge face after the slitting process is scuffed up, or the like. That is, a task to ensure quality (slittability) in the slitting process occurs. Further, when the weight average molecular weight is greater than 2,500,000, the viscosity of the coating liquid, that is prepared at the time of forming the adhesive porous layer, becomes too high, so that it becomes hard to perform high-speed coating, and productivity is lowered.

In particular, for the same reason as above, Mw of the polyvinylidene fluoride resin A is preferably in a range of from 1,000,000 to 2,000,000.

Here, the weight average molecular weight (Mw; Dalton) of the polyvinylidene fluoride resin is a molecular weight measured by gel permeation chromatography (hereinafter also referred to as "GPC") under the following conditions, and represented as a polystyrene-equivalent molecular weight.

<Conditions>
GPC: GPC-900 (manufactured by JASCO Corporation)
Column: TSKGEL SUPER AWM-H×2 columns (manufactured by Tosoh Corporation)
Mobile phase solvent: dimethylformamide (DMF)
Standard sample: monodispersed polystyrene (manufactured by Tosoh Corporation)
Column temperature: 140° C.
Flow rate: 10 mL/min (2) Polyvinylidene Fluoride Resin B Polyvinylidene fluoride resin B is a copolymer which contains at least a structural unit derived from vinylidene fluoride and a structural unit derived from hexafluoropropylene, in which the total content of structural units derived from hexafluoropropylene in the copolymer is greater than 1.5 mol % of the total content of structural units in the copolymer.

By the inclusion of the polyvinylidene fluoride resin B, which has a high copolymerization ratio of hexafluoropropylene, together with the polyvinylidene fluoride resin A, swelling property with respect to an electrolyte can be ensured. The polyvinylidene fluoride resin B may be a mixture obtained by mixing two or more kinds of copolymers.

It is preferable that the total content of structural units derived from hexafluoropropylene in polyvinylidene fluoride resin B is 1.8 mol % or more of the total content of structural units in polyvinylidene fluoride resin B. It is preferable that the content of structural units derived from hexafluoropropylene is less than 25 mol % of the total content of structural units in polyvinylidene fluoride resin B. In particular, the content of structural units derived from hexafluoropropylene is more preferably in a range of more than 2.0 mol % but less than 15 mol %.

The weight average molecular weight (Mw) of the polyvinylidene fluoride resin B is preferably in a range of from 200,000 to 3,000,000. When the weight average molecular weight is 200,000 or more, a sufficient mechanical strength to withstand the compression bonding or heat pressing that is performed at the time of adhesion to electrodes can be ensured. When the weight average molecular weight is less than 3,000,000, the viscosity of the coating liquid is not too high, and favorable formability property can be maintained.

In particular, for the same reason as above, the Mw of the polyvinylidene fluoride resin B is preferably in a range of from 200,000 to 1,000,000.

The Mw is a value measured by the same method as that in the case of polyvinylidene fluoride resin A described above.

As described above, by using the polyvinylidene fluoride resin A and the polyvinylidene fluoride resin B as a mixture, a synergistic effect is exhibited with respect to the adhesion to electrodes, and it is possible to remarkably enhance the adhesive property. Further, by mixing the polyvinylidene fluoride resin A and the polyvinylidene fluoride resin B, the peel force between the porous substrate and the adhesive porous layer is increased.

In the invention, as the polyvinylidene fluoride resin A or the polyvinylidene fluoride resin B, it is preferable to use a copolymer obtained by copolymerization using only vinylidene fluoride and hexafluoropropylene. It is possible to use a copolymer in which an additional monomer other than vinylidene fluoride or hexafluoropropylene is further copolymerized. Examples of such an additional monomer may include one kind or two or more kinds of tetrafluoroethylene, trifluoroethylene, trichloroethylene, vinyl fluoride, or the like.

A polyvinylidene fluoride resin having a relatively high molecular weight as described above can be obtained preferably by emulsion polymerization or suspension polymerization, and particularly preferably by suspension polymerization. It is possible to select a commercially available resin that satisfies the copolymerization ratio of the resin A or B.

It is preferable that the adhesive porous layer contains the polyvinylidene fluoride resin A at a total content of from 15 parts by mass to 85 parts by mass, and contains the polyvinylidene fluoride resin B at a total content of from 85 parts by mass to 15 parts by mass, when the total amount of polyvinylidene fluoride resin A and polyvinylidene fluoride resin B is taken as 100 parts by mass. When the total content of polyvinylidene fluoride resin A is 15 parts by mass or more (namely, the total content of polyvinylidene fluoride resin B is 85 parts by mass or less), a preferable surface morphology as described above can be easily obtained, and the adhesion to electrodes can be enhanced. Further, when the total content of polyvinylidene fluoride resin B is 15 parts by mass or more, the swelling property with respect to an electrolyte as described above is ensured, and the adhesion to electrodes is favorable.

In particular, the mass ratio (resin A/resin B) of polyvinylidene fluoride resin A and polyvinylidene fluoride resin B incorporated in the adhesive porous layer is preferably from 25/75 to 75/25, and more preferably from 35/65 to 65/35.

—Filler—

It is possible to add a filler formed from an inorganic substance or an organic substance, or other additives to the adhesive porous layer in the invention. Thereby, the slipping property or heat resistance of a separator can be improved. In this case, it is preferable that the content or particle size of the filler is adjusted to a degree that does not inhibit the effects of the invention.

As the inorganic filler, the above-described metal oxide, metal hydroxide, or the like can be used.

As the organic filler, for example, an acrylic resin or the like can be used.

It is preferable that the mass of the adhesive porous layer (preferably, polyvinylidene fluoride resin) at one side of the porous substrate is from 0.5 $g/m^2$ to 1.5 $g/m^2$. When the amount of the adhesive porous layer is 0.5 $g/m^2$ or more, the adhesion to electrodes is favorable. Further, when the amount of the adhesive porous layer is 1.5 $g/m^2$ or less, the ion permeability is favorable, and the load characteristics of a battery is enhanced.

In a case in which the adhesive porous layer is formed at both adhesive porous front and back sides, the total mass of the adhesive porous layers (preferably, polyvinylidene fluoride resin) formed at the front and back sides is preferably from 1.0 $g/m^2$ to 3.0 $g/m^2$.

In the invention, in a case in which the adhesive porous layer is formed at both sides of the porous substrate, the difference between the weight at the front side and the weight at the back side is also important. Specifically, it is preferable that the total mass of the adhesive porous layers formed at the front and back sides of the porous substrate is from 1.0 $g/m^2$ to 3.0 $g/m^2$, and that the difference between the mass of the adhesive porous layer at one side and the mass of the adhesive porous layer at the other side is 20% or less of the total mass of the layers at both sides. When this difference is greater than 20%, there are cases in which curling occurs significantly, whereby handling may be interfered, or cycle characteristics may be deteriorated.

—Various Characteristics of Separator—

From the viewpoints of mechanical strength and the energy density when prepared as a battery, it is preferable that the film thickness of the whole separator for a non-aqueous secondary battery of the invention is from 5 μm to 35 μm.

From the viewpoints of the effects of the invention, mechanical strength, handling property, and ion permeability, it is preferable that the separator for a non-aqueous secondary battery of the invention has a porosity within a range of from 30% to 60%.

In view of good balance between mechanical strength and membrane resistance, it is preferable that the separator for a non-aqueous secondary battery of the invention has a Gurley value (JIS P8117) within a range of from 50 sec/100 cc to 800 sec/100 cc.

From the viewpoint of ion permeability, it is preferable that the separator for a non-aqueous secondary battery of the invention has a porous structure. Specifically, the value obtained by subtracting the Gurley value of the porous substrate from the Gurley value of the separator for a non-aqueous secondary battery including an adhesive porous layer formed is preferably 300 sec/100 cc or less, more preferably 150 sec/100 cc or less, and still more preferably 100 sec/100 cc or less. By having a Gurley value of 300 sec/100 cc or less, the adhesive porous layer is not too dense and the ion permeability is maintained favorable, whereby excellent battery characteristics may be obtained.

—Method for Producing Separator for Non-Aqueous Secondary Battery—

The separator for a non-aqueous secondary battery of the invention can be produced by a method in which a coating liquid containing a polyvinylidene fluoride resin is coated on a porous substrate to form a coated layer, and subsequently, the resin in the coated layer is solidified to form an adhesive porous layer on the porous substrate in such a manner that the adhesive porous layer and the porous substrate are integrated.

An adhesive porous layer including a polyvinylidene fluoride resin as an adhesive resin can be suitably formed, for example, by the following wet coating method.

Specifically, first, a polyvinylidene fluoride resin is dissolved in a solvent to prepare a coating liquid. This coating liquid is coated on a porous substrate, followed by immersion in an appropriate coagulation liquid. Thereby, the polyvinylidene fluoride resin is solidified, while inducing a phase separation phenomenon. In this process, the layer formed by using the polyvinylidene fluoride resin has a porous structure. Thereafter, the porous substrate is washed with water to remove the coagulation liquid, followed by drying. In this way, an adhesive porous layer can be formed on the porous substrate in such a manner that the adhesive porous layer and the porous substrate are integrated.

For the above coating liquid, a good solvent that dissolves the polyvinylidene fluoride resin can be used. Preferable examples of such a good solvent, which may be used, include polar amide solvents such as N-methylpyrrolidone, dimethylacetamide, dimethylformamide, or dimethylformamide. From the viewpoint of forming a favorable porous structure, in addition to the above good solvent, it is preferable to mix a phase separation agent that induces phase separation. Examples of such a phase separation agent include water, methanol, ethanol, propyl alcohol, butyl alcohol, butanediol, ethylene glycol, propylene glycol, and tripropylene glycol. Such a phase separation agent is preferably added within a range in which viscosity suitable for coating is ensured. In a case in which a filler or other additives are added to the adhesive porous layer, the filler or additives may be mixed or dissolved into the coating liquid.

From the viewpoint of forming a favorable porous structure, the coating liquid preferably has a total polyvinylidene fluoride resin concentration of from 3% by mass to 10% by mass.

Further, from the viewpoint of forming a suitable porous structure, it is preferable to use a mixed solvent containing a good solvent in an amount of 60% by mass or more and a phase separation agent in an amount of from 5% by mass to 40% by mass, in the coating liquid.

As the coagulation liquid, water, a mixed solvent of water and a good solvent as described above, or a mixed solvent of water, a good solvent as described above, and a phase separation agent as described above can be used. Particularly, a mixed solvent of water, a good solvent, and a phase separation agent is preferable. In this case, it is preferable that the mixing ratio of the good solvent and the phase separation agent is determined according to the mixing ratio of the mixed solvent used for dissolving the polyvinylidene fluoride resin, from the viewpoint of productivity. The concentration of water is preferable from 40% by mass to 90% by mass, from the viewpoints of forming a favorable porous structure and improving the productivity.

With regard to the coating of the coating liquid on a porous substrate, a conventional coating system such as a Mayer bar, a die coater, a reverse roll coater, or a gravure coater can be applied. In a case in which the adhesive porous layer is formed at both sides of the porous substrate, it is also possible that the coating liquid is coated on one side, then on the other side, and then subjected to coagulation, water washing, and drying; however, from the viewpoint of productivity, it is preferable that the coating liquid is coated simultaneously on both sides of the porous substrate, and then subjected to coagulation, water washing, and drying.

Other than the wet coating method described above, the adhesive porous layer can also be produced by a dry coating method. Here, the "dry coating method" refers to a method in which a coating liquid containing a polyvinylidene fluoride resin and a solvent is coated on a porous substrate and then dried to volatilize and remove the solvent, thereby obtaining a porous membrane. However, in a dry coating method, as compared with a wet coating method, the coated membrane easily becomes dense. Accordingly, in the dry coating method, it is difficult to obtain a porous layer, without adding a filler or the like to the coating liquid. Further, even if such a filler or the like is added, it is difficult to obtain a favorable porous structure. Accordingly, from such a point of view, it is preferable to use a wet coating method in the invention.

Moreover, the separator of the invention may also be produced by a method in which an adhesive porous layer and a porous substrate are separately produced, and then these sheets are disposed adjacently in layers and are subjected to compression bonding, heat pressing, or an adhesive, or the like to be formed into a composite. Examples of a method of obtaining an adhesive porous layer as an independent sheet include a method in which a coating liquid is coated on a release sheet, then an adhesive porous layer is formed by using the wet coating method or dry coating method described above, and then only the adhesive porous layer is peeled off.

[Non-Aqueous Secondary Battery]

The non-aqueous secondary battery of the invention uses the separator of the invention described above, and is configured to include a positive electrode, a negative electrode, and the separator for a non-aqueous secondary battery of the invention described above, which is disposed between the positive electrode and the negative electrode. Note that, the term "dope" means occlusion, supporting, adsorption, or insertion, and means a phenomenon in which a lithium ion enters into an active substance of an electrode such as a positive electrode or the like.

A non-aqueous secondary battery has a structure in which a battery element, in which a structural body including a negative electrode and a positive electrode which face each other via a separator is impregnated with an electrolyte, is enclosed in an outer casing material. The non-aqueous secondary battery of the invention is preferable as a non-aqueous electrolyte secondary battery, especially, a lithium ion secondary battery.

The positive electrode may have a structure in which an active substance layer including a positive electrode active substance and a binder resin is formed on a current collector. The active substance layer may further include an electrically conductive additive.

Examples of the positive electrode active substance include lithium cobalt oxide, lithium nickel oxide, lithium manganese oxide having a spinel structure, and lithium iron phosphate having an olivine structure. In the invention, in a case in which the adhesive porous layer of the separator is disposed at the positive electrode side, since the polyvinylidene fluoride resin has excellent oxidation resistance, it is advantageous in that a positive electrode active substance that can be operated at a high voltage of 4.2 V or more, such as $LiMn_{1/2}Ni_{1/2}O_2$ or $LiCo_{1/3}Mn_{1/3}Ni_{1/3}O_2$, can be easily applied.

Examples of the binder resin include a polyvinylidene fluoride resin.

Examples of the electrically conductive additive include acetylene black, KETJENBLACK, and graphite powder.

Examples of the current collector include an aluminum foil having a thickness of from 5 µm to 20 µm.

The negative electrode may have a configuration in which an electrode layer, that includes a negative electrode active substance and a binder resin, is formed on a negative electrode current collector. If necessary, an electrically conductive additive may be added to the electrode layer.

Examples of the negative electrode active substance, which may be used, include carbon materials capable of electrochemically occluding lithium and materials capable of alloying with lithium, such as silicon or tin.

Examples of the binder resin include a polyvinylidene fluride resin and a styrene-butadiene rubber. In the separator for a non-aqueous secondary battery of the invention, since the adhesive property is favorable, a favorable adhesive property can be ensured not only in the case of using a polyvinylidene fluoride resin as the negative electrode binder resin, but also in the case of using a stryrene-butadiene rubber.

Examples of the electrically conductive additive include acetylene black, KETJENBLACK, and graphite powder. Examples of the current collector include a copper foil having a thickness of from 5 µm to 20 µm.

Further, instead of using the negative electrode described above, it is possible to use a metal lithium foil as a negative electrode.

The electrolyte is a solution obtained by dissolving a lithium salt in a non-aqueous solvent.

Examples of the lithium salt include $LiPF_6$, $LiBF_4$, and $LiClO_4$.

Examples of the non-aqueous solvent, which can be preferably used, include cyclic carbonates such as ethylene carbonate, propylene carbonate, fluoroethylene carbonate, or difluoroethylene carbonate; chain carbonates such as dimethyl carbonate, diethyl carbonate, ethyl methyl carbonate, or a fluorine substitution product thereof; cyclic esters such as γ-butyrolactone or γ-valerolactone; and any mixed solvent thereof.

Particularly, as the electrolyte, an electrolyte which is obtained by mixing cyclic carbonate and chain carbonate at a mass ratio (cyclic carbonate/chain carbonate) of from 20/80 to 40/60, and dissolving a lithium salt in the resulting mixed solvent such that the concentration is from 0.5 M to 1.5 M is preferable.

In a separator including a conventional adhesive porous layer, there are cases in which adhesion to electrodes is hardly exhibited, depending on the kind of electrolyte used. However, according to the separator of the invention, favorable adhesion property can be exhibited, regardless of the kind of electrolyte, which is thus advantageous.

The separator for a non-aqueous secondary battery of the invention is also applicable to a battery having a metal can outer casing. However, because of having favorable adhesion to electrodes, the separator of the invention is suitable for use in a soft pack battery having an aluminum laminate film as the outer casing material. The method for producing such a battery is as follows. Namely, a positive electrode and a negative electrode are joined via a separator, and then this joined product is impregnated with an electrolyte and enclosed in an aluminum laminate film. Thereafter, the resulting product is subjected to compression bonding or heat pressing, whereby a non-aqueous secondary battery can be obtained. By having such a configuration, the electrodes and the separator are favorably adhered to each other, and thus a non-aqueous secondary battery having an excellent cycle life is obtained. In addition, because of having favorable adhesion between the electrodes and the separator, a battery having excellent safety can be obtained. Examples of a method of joining electrodes and a separator include a stacking method in which electrodes and a separator are disposed one on another in layers, and a method in which electrodes and a separator are wound together. The invention is applicable to any of the above methods.

EXAMPLES

Hereinafter, the present invention is described with reference to Examples. However, the invention is by no means limited to the following Examples.

(Measurement and Evaluation)

With regard to the separators and lithium ion secondary batteries which were prepared in Examples and Comparative Examples described below, the following measurements and evaluations were performed. Results of the measurements and evaluations are shown in the tables described below.

[Weight Average Molecular Weight of Polyvinylidene Fluoride Resin]

The weight average molecular weight of polyvinylidene fluoride resin was measured by gel permeation chromatography (GPC) under the following conditions, and determined as a polystyrene-equivalent molecular weight.

<Conditions>
GPC: GPC-900 (manufactured by JASCO Corporation)
Column: TSKGEL SUPER AWM-H (2 columns) (manufactured by Tosoh Corporation)
Mobile phase solvent: dimethylformamide (DMF)
Standard sample: monodispersed polystyrene [manufactured by Tosoh Corporation]
Column temperature: 40° C.
Flow rate: 10 mL/min

[Composition of Polyvinylidene Fluoride Resin]

The composition of polyvinylidene fluoride resin was determined from NMR spectrum. The NMR spectrum was obtained by dissolving 20 mg of polyvinylidene fluoride resin in 0.6 mL of deuterated dimethyl sulfoxide at 100° C. and measuring $^{19}F$-NMR spectrum at 100° C.

[Film Thickness]

The thickness (μm) of the separator was determined by measuring arbitrary selected 20 points in 10 cm×10 cm, using a contact thickness meter (LITEMATIC, manufactured by Mitutoyo Corporation), and arithmetically averaging the measured values. The measurement was performed using a cylindrical measuring terminal having a diameter of 5 mm, with adjustment so that a load of 7 g was applied during the measurement.

[Weight Per Unit Area]

The separator was cut into a 10 cm×10 cm piece, and the mass of the piece was measured. The obtained mass was divided by the area to determine the weight per unit area.

[Average Pore Size]

The average pore size of the adhesive porous layer was determined by the following method.

By a gas adsorption method, applying the BET equation, the specific surface area (m$^2$/g) of the polyolefin microporous membrane and the specific surface area (m$^2$/g) of the separator, which was a composite membrane in which a polyolefin microporous membrane and an adhesive porous layer placed are layered one on another, were measured. These specific surface areas (m$^2$/g) were multiplied by the respective weights per unit (g/m$^2$) to calculate the pore surface areas per 1 m$^2$ of sheet. Then, the pore surface area of the polyolefin microporous membrane was subtracted from the pore surface area of the separator, to calculate the pore surface area S per 1 m$^2$ of the adhesive porous layer. Separately, the pore volume V per 1 m$^2$ of sheet was calculated from the porosity. Here, assuming that all pores were cylindrical, the average pore size (diameter) d of the adhesive porous layer was determined from the following Equation 2, using the pore surface area S and the pore volume V.

$$d=4\cdot V/S \quad \text{(Equation 2)}$$

d: average pore size (nm) of adhesive porous layer
V: pore volume per 1 m$^2$ of adhesive porous layer
S: pore surface area per 1 m$^2$ of adhesive porous layer This average pore size d was designated as the average pore size of the porous layer formed from a polyvinylidene fluoride resin.

[Porosity]

The porosities of the separator for a non-aqueous secondary battery and the porous substrate were determined from the following Equation 3.

$$\epsilon=\{1-Ws/(ds\cdot t)\}\times 100 \quad \text{(Equation 3)}$$

Here, ε represents the porosity (%), Ws represents the weight per unit area (g/m$^2$), ds represents the true density (g/cm$^3$), and t represents the film thickness (μm).

Specifically, for example, the porosity δ (%) of a composite separator in which a polyethylene porous substrate and a porous layer formed only from a polyvinylidene fluoride resin are layered one another was calculated according to the following Equation 4.

$$\epsilon=\{1-(Wa/0.95+Wb/1.78)\}\times 100 \quad \text{(Equation 4)}$$

Here, Wa represents the weight per unit area (g/m$^2$) of the substrate, Wb represents the weight (g/m$^2$) of the polyvinylidene fluoride resin, and t represents the film thickness (μm).

In the case of calculating the porosity of the adhesive porous layer, Wa=0 (g/m$^2$), and t represents the thickness of the adhesive porous layer, namely, a value obtained by subtracting the film thickness of the substrate from the film thickness of the separator.

[Mass of Polyvinylidene Fluoride Resin]

With regard to each surface of the separator, the weight (g/m$^2$) of polyvinylidene fluoride resin was determined from the intensity of the FKa spectrum, using an energy dispersion fluorescent X-ray analyzer (EDX-800HS, manufactured by Shimadzu Corporation). In this measurement, the weight of the polyvinylidene fluoride resin on the X-ray irradiated side is measured. Therefore, in a case in which the porous layer using a polyvinylidene fluoride resin is formed at both front and back sides, the front and back are each subjected to the measurement to measure the masses of polyvinylidene fluoride resin on the front and back, and the measured values are summed to determine the front back total mass.

[Gurley Value]

The Gurley value was measured in accordance with JIS P8117, using a Gurley densometer (G-B2C, manufactured by Toyo Seiki Co., Ltd.).

[Resistance of Separator]

The separator was impregnated with 1 M $LiBF_4$-propylene carbonate/ethylene carbonate (=1/1 [mass ratio]) as an electrolyte, and sandwiched between aluminum foil electrodes each having a lead tab attached, and then enclosed in an aluminum pack, to produce a test cell. The resistance (ohm·$cm^2$) of the obtained test cell was measured in accordance with an alternating current impedance method (measurement frequency: 100 kHz) at 20° C.

[Peel Force]

A tape (SCOTCH (registered trademark) MENDING TAPE 810, manufactured by 3M) was attached on both surfaces of the separator, and the separator was cut to a size of 10 mm×200 mm to obtain a test piece. In one of the edge portions in the longitudinal direction of this test piece, the edge portions of the tapes on both surfaces were each pealed off, and the edge portions of the two tapes that had been peeled off were held by a tensile tester (TENSILON UNIVERSAL TESTER RTC-1210A, manufactured by Orientec Co., Ltd.). Then, a peeling test was carried out under the following conditions. Namely, the tensile direction was the direction perpendicular to the surface of the test piece, and the tensile speed was 20 mm/min. The average of the stress values at 30 mm to 100 mm (the values obtained by continuously measuring during peeling from 30 mm to 100 mm from the initiation of tensile) was designated as the peel force (N/cm).

[Thermal Shrinkage Percentage]

The separator was cut to a size of 18 cm (MD direction)×6 cm (TD direction) to obtain a test piece. In an oven at 105° C., the test piece was hanged such that the MD direction corresponded to the gravity direction, and subjected to a heat treatment for 30 minutes without applying tension. After the heat treatment, the test piece was taken out from the oven, and with regard to each of the MD direction and the TD direction, the thermal shrinkage percentage (%) was calculated according to the following equation.

Thermal shrinkage percentage (%)=(Length of test piece before heat treatment−Length of test piece after heat treatment)/(Length of test piece before heat treatment)×100

[Equilibrium Moisture Content]

The separator was left to stand under an environment of a temperature of 20° C. and a relative humidity of 40% for 3 days to perform humidity conditioning, and the moisture was vaporized in a vaporizer (model VA-100, manufactured by Mitsubishi Chemical Analytech Co., Ltd.) at 120° C. Thereafter, the moisture content was measured using a Karl Fischer moisture meter (CA-100, manufactured by Mitsubishi Chemical Co., Ltd.).

[Adhesion to Electrode]

Five test batteries were disassembled, and the peel strength when peeling off the separator from the negative electrode and the peel strength when peeling off the separator from the positive electrode were measured using a tensile tester. The average value of peel strength with respect to the negative electrode and the average value of peel strength with respect to the positive electrode were each calculated. Then, the average value of peel strength respect to the negative electrode and the average value of peel strength respect to the positive electrode were averaged, and the obtained value was used as an index for evaluation of adhesive property.

Note that, the average value of peel strengths with respect to the negative electrode and the positive electrode for each separator is shown as a relative value, taking the average value of peel strengths with respect to the negative electrode and the positive electrode for the separator of Example 1 as 100.

[Cycle Characteristic]

With regard to the test battery, an operation (cycle test) of repeatedly performing charging and discharging was carried out under 25° C. In this process, the charge condition was constant-current constant-voltage charge at 1 C and 4.2 V, and the discharge condition was constant-current discharge at 1 C and 2.75 V cut-off. The cycle characteristics were evaluated, using the capacity retention ratio (%) after 100 cycles as an index.

Capacity retention ratio (%)=(Discharge capacity at the 100th cycle)/(Initial discharge capacity)×100

[Load Characteristic]

With regard to the test battery, the discharge capacity when discharging at 0.2 C and a discharge capacity when discharging at 2 C were measured under the temperature of 25° C., and the relative discharge capacity (%) determined from the following equation was used as an index for evaluation of load characteristics. Here, the charge condition was constant-current constant-voltage charge for 8 hours at 0.2 C and 4.2 V, and the discharge condition was constant-current discharge at 2.75 V cut-off.

Relative discharge capacity (%)=(Discharge capacity at 2 C)/(Discharge capacity at 0.2 C)×100

Note that, the index of load characteristics is also the index of ion permeability of a separator after adhesion.

[Separation]

The presence or absence of separation of the adhesive porous layer, when conveying the separator at a conveyance speed of 40 m/min, a take-out tension of 0.3 N/cm, and a take-up tension of 0.1 N/cm, was visually observed. Evaluation was performed according to the following evaluation criteria. As the number of foreign matters generated due to separation, the number of the foreign matters observed in a state of being fallen down or being held between the edge faces of the take-up roll was counted.

<Evaluation Criteria>

A: Separation is not recognized.

B: The number of foreign matters generated due to separation is from 1 to 5 per 1,000 $m^2$.

C: The number of foreign matters generated due to separation is more than 5 but 20 or less per 1,000 $m^2$.

D: The number of foreign matters generated due to separation is more than 20 per 1,000 $m^2$.

[Slittability]

The separator was conveyed at a conveyance speed of 40 m/min, a take-out tension of 0.3 N/cm, and a take-up tension of 0.1 N/cm, and during the conveyance, the separator was subjected to a slit treatment using a shear cutter. Thereafter, the external appearance of the edge face (slit edge face) was visually observed, and evaluated according to the following evaluation criteria.

<Evaluation Criteria>

A: The dislocation of the edge face position is 0.5 mm or less.

B: The dislocation of the edge face position is more than 0.5 mm but 2 mm or less.

C: The dislocation of the edge face position is more than 2 mm but 5 mm or less.

D: The dislocation of the edge face position is more than 5 mm.

Example 1

Preparation of Separator for Non-Aqueous Secondary Battery

As polyvinylidene fluoride resin A, polyvinylidene fluoride (a vinylidene fluoride homopolymer) having a weight average molecular weight (Mw) of 700,000 was produced by polymerizing vinylidene fluoride by suspension polymerization. Further, as polyvinylidene fluoride resin B, a vinylidene fluoride/hexafluoropropylene (=95.2/4.8 [mol %]) copolymer (weight average molecular weight: 470,000) was prepared.

The above polyvinylidene fluoride resins A and B were mixed at a ratio of 50/50 [mass ratio], and the mixture of the polyvinylidene fluoride resins was dissolved in a mixed solvent obtained by mixing dimethylacetamide (DMAc) and tripropylene glycol (TPG) at a ratio of 7/3 (=DMAc/TPG; mass ratio) such that the concentration was 5% by mass, to prepare a coating liquid. Equal amounts of this coating liquid were coated respectively on both surfaces of a polyethylene microporous membrane (film thickness: 9 μm, Gurley value: 160 sec/100 cc, porosity: 43%), followed by immersion in a coagulation liquid obtained by mixing water, dimethylacetamide, and tripropylene glycol (water/DMAc/TPG=57/30/13 [mass ratio]) at 40° C. After solidifying the coated membrane by the immersion, water washing and drying were performed, to obtain a separator for a non-aqueous secondary battery having an adhesive porous layer formed on the polyolefin microporous membrane.

With regard to the obtained separator, the contents of hexafluoropropylene (HFP) in the polyvinylidene fluoride resins A and B that constitute the adhesive porous layer, the mixing ratio of the polyvinylidene fluoride resins A and B, the weight average molecular weight (Mw) of the polyvinylidene fluoride resin A, the film thickness and weight per unit area of the separator, the average pore size of the adhesive porous layer, the porosities of the separator and the adhesive porous layer, the mass (the total weight at both sides, and the ratio of the difference between the mass at the front side and the mass at the back side relative to the total mass at both sides) of the adhesive porous layer (PVDF resin), and the Gurley value of the separator were measured according to the methods described above. The measurement results are shown in Table 1.

Also with regard to the separators of Examples and Comparative Examples shown below, the same measurements were performed. The measurement results are summarized in Table 1.

—Production of Non-Aqueous Secondary Battery—

(Production of Negative Electrode)

300 g of artificial graphite, which is a negative electrode active substance, 7.5 g of a water-soluble dispersion including a modified product of a styrene-butadiene copolymer, which is a binder, in an amount of 40% by mass, 3 g of carboxymethylcellulose, which is a thickener, and an appropriate amount of water were stirred using a double-arm mixer, thereby obtaining a slurry for a negative electrode. This slurry for a negative electrode was coated on a copper foil having a thickness of 10 μm, which is a negative electrode current collector, and the resulting coated membrane was dried, followed by pressing, to produce a negative electrode having a negative electrode active substance layer.

(Production of Positive Electrode)

89.5 g of lithium cobalt oxide powder, which is a positive electrode active substance, 4.5 g of acetylene black, which is an electrically conductive additive, and polyvinylidene fluoride, which is a binder, were dissolved in NMP such that the amount of the polyvinylidene fluoride was 6% by mass, and the obtained solution was stirred using a double-arm mixer such that the weight of the polyvinylidene fluoride was 6% by mass, thereby obtaining a slurry for a positive electrode. This slurry for a positive electrode was coated on an aluminum foil having a thickness of 20 μm, which is a positive electrode current collector, and the resulting coated membrane was dried, followed by pressing, to produce a positive electrode having a positive electrode active substance layer.

(Production of Battery)

To each of the positive electrode and negative electrode produced as described above, a lead tab was welded. Then, the positive and negative electrodes were joined together via the separator produced in Examples and Comparative Examples described above, impregnated with an electrolyte, and enclosed in an aluminum pack using a vacuum sealer. Here, 1 M LiPF$_6$ ethylene carbonate/ethyl methyl carbonate (=3/7 weight ratio) was used as the electrolyte. This aluminum pack was subjected to heat pressing using a heat press machine at 90° C. for 2 minutes, while applying a load of 20 kg per 1 cm$^2$ of electrode. In this way, a test battery was produced.

Example 2

A separator for a non-aqueous secondary battery according to the invention was produced, and, further, a non-aqueous secondary battery was produced, in the same manner as in Example 1, except that the polyvinylidene fluoride having Mw of 700,000, which was used as polyvinylidene fluoride resin A, in Example 1 was replaced with a polyvinylidene fluoride which had a weight average molecular weight of 1,900,000 and was prepared by suspension polymerization.

Example 3

A separator for a non-aqueous secondary battery according to the invention was produced, and, further, a non-aqueous secondary battery was produced, in the same manner as in Example 1, except that the polyvinylidene fluoride having Mw of 700,000, which was used as polyvinylidene fluoride resin A, in Example 1 was replaced with a vinylidene fluoride/hexafluoropropylene copolymer (=98.6/1.4 [mol %]) which had a weight average molecular weight of 700,000 and was prepared by suspension polymerization.

Example 4

A separator for a non-aqueous secondary battery according to the invention was produced, and, further, a non-aqueous secondary battery was produced, in the same manner as in Example 1, except that, in Example 1, the mixing ratio (resin A/resin B [mass ratio]) of the polyvinylidene fluoride resin A and the polyvinylidene fluoride resin B was changed from 50/50 to 10/90.

Example 5

A separator for a non-aqueous secondary battery according to the invention was produced, and, further, a non-aqueous secondary battery was produced, in the same manner as in Example 1, except that, in Example 1, the mixing ratio (resin A/resin B [mass ratio]) of the polyvinylidene fluoride resin A and the polyvinylidene fluoride resin B was changed from 50/50 to 20/80.

Example 6

A separator for a non-aqueous secondary battery according to the invention was produced, and, further, a non-aqueous secondary battery was produced, in the same manner as in Example 1, except that, in Example 1, the mixing ratio (resin A/resin B [mass ratio]) of the polyvinylidene fluoride resin A and the polyvinylidene fluoride resin B was changed from 50/50 to 80/20.

Example 7

A separator for a non-aqueous secondary battery according to the invention was produced, and, further, a non-aqueous secondary battery was produced, in the same manner as in Example 1, except that, in Example 1, the mixing ratio (resin A/resin B [mass ratio]) of the polyvinylidene fluoride resin A and the polyvinylidene fluoride resin B was changed from 50/50 to 90/10.

Example 8

A separator for a non-aqueous secondary battery according to the invention was produced, and, further, a non-aqueous secondary battery was produced, in the same manner as in Example 1, except that the polyvinylidene fluoride having Mw of 700,000, which was used as polyvinylidene fluoride resin A, in Example 1 was replaced with a vinylidene fluoride/hexafluoropropylene copolymer (=99.2/0.8 [mol %]) which had a weight average molecular weight of 1,100,000 and was prepared by suspension polymerization.

Comparative Example 1

A separator for a non-aqueous secondary battery according to the invention was produced, and, further, a non-aqueous secondary battery was produced, in the same manner as in Example 1, except that the polyvinylidene fluoride having Mw of 700,000, which was used as polyvinylidene fluoride resin A, in Example 1 was replaced with a polyvinylidene fluoride which had a weight average molecular weight of 500,000 and was prepared by suspension polymerization.

Comparative Example 2

A separator for a non-aqueous secondary battery according to the invention was produced, and, further, a non-aqueous secondary battery was produced, in the same manner as in Example 1, except that the polyvinylidene fluoride having Mw of 700,000, which was used as polyvinylidene fluoride resin A, in Example 1 was replaced with a polyvinylidene fluoride which had a weight average molecular weight of 2,600,000 and was prepared by suspension polymerization.

Comparative Example 3

A separator for a non-aqueous secondary battery according to the invention was produced, and, further, a non-aqueous secondary battery was produced, in the same manner as in Example 1, except that, in Example 1, the mixing ratio (resin A/resin B [mass ratio]) of the polyvinylidene fluoride resin A and the polyvinylidene fluoride resin B was changed from 50/50 to 0/100.

Comparative Example 4

A separator for a non-aqueous secondary battery according to the invention was produced, and, further, a non-aqueous secondary battery was produced, in the same manner as in Example 1, except that, in Example 1, the mixing ratio (resin A/resin B [mass ratio]) of the polyvinylidene fluoride resin A and the polyvinylidene fluoride resin B was changed from 50/50 to 100/0.

Comparative Example 5

A separator for a non-aqueous secondary battery according to the invention was produced, and, further, a non-aqueous secondary battery was produced, in the same manner as in Example 1, except that the polyvinylidene fluoride having Mw of 700,000, which was used as polyvinylidene fluoride resin A, in Example 1 was replaced with a vinylidene fluoride/hexafluoropropylene copolymer (=98.0/2.0 [mol %]) which had a weight average molecular weight of 700,000 and was prepared by suspension polymerization.

Comparative Example 6

A mixture obtained by mixing a polyvinylidene fluoride resin having a weight average molecular weight of 400,000 and a vinylidene fluoride/hexafluoropropylene copolymer having a weight average molecular weight of 270,000 and a molar ratio of 94.5/5.5, that is, 88/12 in terms of weight ratio, in such a manner that the weight ratio was 60/40, was used. This vinylidene fluoride resin mixture was dissolved in 1-methyl-2-pyrrolidone (NMP) to obtain a coating liquid. Equal amounts of the coating liquid were coated respectively on both surfaces of a polyethylene microporous membrane (film thickness: 9 µm, Gurley value: 160 sec/100 cc, porosity: 43%), followed by immersion in methanol, to perform solidification. Subsequently, the coated membrane was washed with water, followed by drying, to obtain a separator having an adhesive porous layer formed from polyvinylidene fluoride resins at both sides of the polyethylene microporous membrane. Further, using this separator, a non-aqueous secondary battery was produced.

TABLE 1

| | Content of HFP in PVDF Resins (mol %) | | Mixing Ratio of PVDF Resins [% by mass] | | Mw of Resin A | Film Thickness (μm) | Weight per Unit Area (g/m²) | Pore Size of Porous Layer (nm) | Porosity (%) | | | Mass of PVDF Resins (g/m²) | | Gurley Value (sec/ 100 cc) |
|---|---|---|---|---|---|---|---|---|---|---|---|---|---|---|
| | Resin A | Resin B | Resin A | Resin B | | | | | Separator | Porous Layer | Total | Front Back Difference | | |
| Example 1 | 0 | 4.8 | 50 | 50 | 70 × 10⁴ | 12 | 7.79 | 57 | 40 | 45 | 2.51 | 0% | | 215 |
| Example 2 | 0 | 4.8 | 50 | 50 | 190 × 10⁴ | 11 | 7.76 | 55 | 39 | 44 | 2.48 | 0% | | 211 |
| Example 3 | 1.4 | 4.8 | 50 | 50 | 70 × 10⁴ | 11 | 7.73 | 58 | 40 | 48 | 2.45 | 0% | | 204 |
| Example 4 | 0 | 4.8 | 10 | 90 | 70 × 10⁴ | 11 | 7.82 | 78 | 41 | 51 | 2.54 | 0% | | 201 |
| Example 5 | 0 | 4.8 | 20 | 80 | 70 × 10⁴ | 11 | 7.67 | 67 | 41 | 50 | 2.39 | 0% | | 203 |
| Example 6 | 0 | 4.8 | 80 | 20 | 70 × 10⁴ | 11 | 7.69 | 36 | 38 | 37 | 2.41 | 0% | | 225 |
| Example 7 | 0 | 4.8 | 90 | 10 | 70 × 10⁴ | 11 | 7.62 | 32 | 38 | 35 | 2.34 | 0% | | 233 |
| Example 8 | 0.8 | 4.8 | 50 | 50 | 110 × 10⁴ | 11 | 7.79 | 51 | 40 | 45 | 2.51 | 0% | | 220 |
| Comparative Example 1 | 0 | 4.8 | 50 | 50 | 50 × 10⁴ | 11 | 7.77 | 61 | 39 | 43 | 2.49 | 0% | | 213 |
| Comparative Example 2 | 0 | 4.8 | 50 | 50 | 260 × 10⁴ | 12 | 7.79 | 54 | 40 | 46 | 2.51 | 0% | | 221 |
| Comparative Example 3 | — | 4.8 | 0 | 100 | — | 16 | 7.79 | 1231 | 56 | 79 | 2.51 | 0% | | 196 |
| Comparative Example 4 | 0 | — | 100 | 0 | 70 × 10⁴ | 11 | 7.8 | 18 | 36 | 25 | 2.52 | 0% | | 586 |
| Comparative Example 5 | 2 | 4.8 | 50 | 50 | 70 × 10⁴ | 11 | 7.84 | 967 | 51 | 73 | 2.56 | 0% | | 196 |
| Comparative Example 6 | 0 | 5.5 | 60 | 40 | 40 × 10⁴ | 19 | 9.73 | 1450 | 60 | 75 | 4.45 | 100% | | 295 |

TABLE 2

| | Resistance Value (ohm/cm²) | Adhesion to Electrode | Peel Force (N/cm) | Thermal Shrinkage Percentage (MD/TD; %) | Separation | Slittability | Cycle Characteristic (%) | Load Characteristic (%) |
|---|---|---|---|---|---|---|---|---|
| Example 1 | 3.11 | 100 | 0.20 | 5/2 | A | A | 85 | 91 |
| Example 2 | 3.15 | 101 | 0.19 | 5/2 | A | A | 83 | 90 |
| Example 3 | 3.01 | 134 | 0.30 | 5/2 | A | A | 95 | 96 |
| Example 4 | 3.02 | 90 | 0.28 | 5/2 | B | B | 79 | 90 |
| Example 5 | 3.03 | 93 | 0.27 | 5/2 | B | B | 80 | 90 |
| Example 6 | 3.21 | 95 | 0.18 | 5/2 | A | A | 80 | 89 |
| Example 7 | 3.2 | 89 | 0.17 | 5/2 | B | B | 77 | 90 |
| Example 8 | 3.1 | 120 | 0.25 | 5/2 | A | A | 90 | 91 |
| Comparative Example 1 | 3.21 | 98 | 0.20 | 5/2 | C | C | 80 | 90 |
| Comparative Example 2 | 3.14 | 99 | 0.18 | 5/2 | C | C | 78 | 91 |
| Comparative Example 3 | 3.54 | 59 | 0.29 | 5/2 | D | C | 55 | 93 |
| Comparative Example 4 | 5.31 | 53 | 0.11 | 5/2 | D | D | 32 | 41 |
| Comparative Example 5 | 3.5 | 60 | 0.20 | 5/2 | C | D | 56 | 80 |
| Comparative Example 6 | 6.01 | 80 | 0.35 | 5/2 | D | D | 76 | 90 |

Further, the equilibrium moisture content of each of the separators of Examples and Comparative Examples described above was measured. It was revealed that, in all separators, the equilibrium moisture content was 1,000 ppm or less.

As is shown in Table 2, in Examples, a separator which exhibited favorable adhesion to electrodes and excellent slittability and in which separation was suppressed was obtained.

INDUSTRIAL APPLICABILITY

The separator for a non-aqueous secondary battery of the invention is suitable for use in a non-aqueous secondary battery. The separator is particularly suitable for use in a non-aqueous secondary battery having an aluminum laminate outer casing material, in which joining to electrodes is important.

The disclosure of Japanese Patent Application No. 2011-231834 is incorporated by reference herein in its entirety.

All publications, patent applications, and technical standards mentioned in this specification are herein incorporated by reference to the same extent as if such individual publication, patent application, or technical standard was specifically and individually indicated to be incorporated by reference.

The invention claimed is:

1. A separator for a non-aqueous secondary battery, comprising:
    a porous substrate; and
    an adhesive porous layer that is formed at at least one side of the porous substrate and contains the following (1) polyvinylidene fluoride resin A and the following (2) polyvinylidene fluoride resin B:
    (1) polyvinylidene fluoride resin A selected from the group consisting of vinylidene fluoride homopolymers having a weight average molecular weight of from 700,000 to 2,500,000, and vinylidene fluoride copolymers having a weight average molecular weight of from 700,000 to 2,500,000 and containing a structural unit derived from vinylidene fluoride and a structural unit derived from hexafluoropropylene, the total content of structural units derived from hexafluoropropylene in each of the vinylidene fluoride copolymers being 1.5 mol % or less of the total content of structural units in each of the vinylidene fluoride copolymers; and
    (2) polyvinylidene fluoride resin B selected from the group consisting of vinylidene fluoride copolymers containing a structural unit derived from vinylidene fluoride and a structural unit derived from hexafluoropropylene, the total content of structural units derived from hexafluoropropylene in each of the vinylidene fluoride copolymers being greater than 1.5 mol % of the total content of structural units in each of the vinylidene fluoride copolymers.

2. The separator for a non-aqueous secondary battery according to claim 1, wherein the weight average molecular weight of the polyvinylidene fluoride resin A is from 1,000,000 to 2,000,000.

3. The separator for a non-aqueous secondary battery according to claim 1, wherein the adhesive porous layer has a porosity of from 30% to 60% and an average pore size of from 20 nm to 100 nm.

4. The separator for a non-aqueous secondary battery according to claim 1, wherein, in the adhesive porous layer, the total content of the polyvinylidene fluoride resin A is from 15 parts by mass to 85 parts by mass and the total content of the polyvinylidene fluoride resin B is from 85 parts by mass to 15 parts by mass, when the total amount of the polyvinylidene fluoride resin A and the polyvinylidene fluoride resin B is taken as 100 parts by mass.

5. The separator for a non-aqueous secondary battery according to claim 1, wherein an amount of the adhesive porous layer at one side of the porous substrate is from 0.5 $g/m^2$ to 1.5 $g/m^2$.

6. A non-aqueous secondary battery comprising a positive electrode, a negative electrode, and the separator for a non-aqueous secondary battery according to claim 1, the separator being disposed between the positive electrode and the negative electrode, wherein in the non-aqueous secondary battery, electromotive force is obtained by lithium doping/dedoping.

7. The non-aqueous secondary battery according to claim 6, further comprising an aluminum laminate film as an outer casing material, wherein a multilayer structure in which the positive electrode, the negative electrode, and the separator for a non-aqueous secondary battery are adhered to each other, is housed in the aluminum laminate film.

* * * * *